US009102868B2

(12) United States Patent
Rule et al.

(10) Patent No.: US 9,102,868 B2
(45) Date of Patent: Aug. 11, 2015

(54) ELASTOMER-MODIFIED CROSSLINKED EPOXY VINYL ESTER PARTICLES AND METHODS FOR MAKING AND USING THE SAME

(75) Inventors: Joseph D. Rule, Cottage Grove, MN (US); Mohit Malik, Calgary (CA); Randy S. Frank, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 373 days.

(21) Appl. No.: 13/813,000

(22) PCT Filed: Jul. 27, 2011

(86) PCT No.: PCT/US2011/045450
§ 371 (c)(1),
(2), (4) Date: Jan. 29, 2013

(87) PCT Pub. No.: WO2012/015860
PCT Pub. Date: Feb. 2, 2012

(65) Prior Publication Data
US 2013/0126161 A1    May 23, 2013

Related U.S. Application Data

(60) Provisional application No. 61/368,792, filed on Jul. 29, 2010, provisional application No. 61/509,827, filed on Jul. 20, 2011.

(51) Int. Cl.
*C09K 8/80* (2006.01)
*C09K 8/62* (2006.01)
*E21B 43/267* (2006.01)

(52) U.S. Cl.
CPC ... *C09K 8/80* (2013.01); *C09K 8/62* (2013.01); *E21B 43/267* (2013.01)

(58) Field of Classification Search
None
See application file for complete search history.

(56) References Cited

U.S. PATENT DOCUMENTS

| | | |
|---|---|---|
| 2,191,520 A | 2/1940 | Crawford et al. |
| 2,594,913 A | 4/1952 | Grim |
| 2,978,340 A | 4/1961 | Veatch et al. |
| 3,030,215 A | 4/1962 | Veatch et al. |
| 3,129,086 A | 4/1964 | Veatch et al. |
| 3,230,064 A | 1/1966 | Veatch et al. |
| 3,301,742 A | 1/1967 | Noland et al. |
| 3,365,315 A | 1/1968 | Beck |
| 3,373,075 A | 3/1968 | Fekete et al. |
| 4,143,090 A | 3/1979 | Vargiu et al. |
| 4,391,646 A | 7/1983 | Howell |
| 4,398,003 A | 8/1983 | Irwin |
| 4,767,726 A | 8/1988 | Marshall |
| 4,996,270 A | 2/1991 | Czauderna et al. |
| 5,198,510 A | 3/1993 | Siebert et al. |
| 5,422,183 A | 6/1995 | Sinclair et al. |
| 5,531,274 A | 7/1996 | Bienvenu, Jr. |
| 6,034,155 A | 3/2000 | Espeland et al. |
| 6,248,838 B1 | 6/2001 | Albright |
| 6,451,953 B1 | 9/2002 | Albright |
| 6,983,797 B2 | 1/2006 | Nguyen et al. |
| 7,066,262 B2 | 6/2006 | Funkhouser |
| 7,322,411 B2 | 1/2008 | Brannon et al. |
| 7,556,853 B2 | 7/2009 | Chauray et al. |
| 2001/0020053 A1 | 9/2001 | Mariaggi et al. |
| 2005/0272611 A1 | 12/2005 | Lord et al. |
| 2006/0078682 A1 | 4/2006 | McDaniel et al. |
| 2006/0122049 A1 | 6/2006 | Marshall et al. |
| 2006/0258546 A1 | 11/2006 | Brannon et al. |
| 2007/0021309 A1 | 1/2007 | Bicerano |
| 2007/0066491 A1 | 3/2007 | Bicerano et al. |
| 2007/0144736 A1 | 6/2007 | Shinbach et al. |
| 2007/0161515 A1 | 7/2007 | Bicerano |
| 2007/0181302 A1 | 8/2007 | Bicerano |
| 2007/0193745 A1 | 8/2007 | Fulton et al. |
| 2008/0261837 A1 | 10/2008 | Usova et al. |
| 2010/0065271 A1 | 3/2010 | McCrary et al. |

FOREIGN PATENT DOCUMENTS

| | | |
|---|---|---|
| JP | 03-134028 | 6/1991 |
| JP | 2003002942 | 1/2003 |
| WO | WO 99/27229 | 6/1999 |
| WO | WO 2004/092254 | 10/2004 |
| WO | WO 2004/104371 | 12/2004 |
| WO | WO 2006/135892 | 12/2006 |
| WO | WO 2008/006580 | 1/2008 |
| WO | WO 2009/005880 | 1/2009 |
| WO | WO 2012/015857 | 2/2012 |

OTHER PUBLICATIONS

AOC Technical Paper, "Predicting Composite Elastic Modulus Using with Polymer Castings Data" (Oct. 2007).*
Zhiyong Hao et al, Study and Progress of Epoxy Vinyl Ester Resin Toughening Technology, Insulating Material 40(1), Feb. 28, 2007, pp. 40-43.
Zhou Runpei, Epoxy Vinyl Ester Resin (III): the Stability of Epoxy Vinyl Ester Resins in Organic Solvents, Thermosetting resin, vol. 18, 2003(3), p. 37-39.
Zhong Fangguo, Varieties and Properties of Epoxy Vinyl Ester Resin, Fiber Composites, 2005(1), p. 60-64.
International Search Report for PCT/US2011/045444, dated Mar. 28, 2012.
International Search Report for PCT/US2011/045444, dated Dec. 16, 2011.
D. Stevanovic et al., Chemical and Mechanical Properties of Vinyl-Ester/ABS Blends, Polymer, vol. 43, Dec. 31, 2002, pp. 4503-4514.
Document 1228 V3 F2, Language EN V1, Technical Datasheet, Ashland Performance Materials, 2012.
Zhou Runpei, Epoxy Vinyl Ester Resin (III): the Stability of Epoxy Vinyl Ester Resins in Organic Solvents, Thermosetting resin, vol. 18, 2003(3), pp. 37-39.
Zhong Fangguo, Varieties and Properties of Epoxy Vinyl Ester Resin, Fiber Composites, 2005(1), pp. 60-64.

* cited by examiner

*Primary Examiner* — Mark Kaucher
*Assistant Examiner* — Kregg Brooks

(57) ABSTRACT

A plurality of particles comprising an elastomer-modified crosslinked aromatic epoxy vinyl ester polymer, wherein a particle from the plurality of particles maintains at least 50 percent of its height under a pressure of $1.7 \times 10^7$ Pascals at a temperature of at least 150° C. is disclosed. Mixtures of the plurality of particles and other particles, fluids containing the plurality of particles, methods of making the plurality of particles, and methods of fracturing a subterranean geological formation are also disclosed.

17 Claims, No Drawings

ELASTOMER-MODIFIED CROSSLINKED EPOXY VINYL ESTER PARTICLES AND METHODS FOR MAKING AND USING THE SAME

CROSS-REFERENCE TO RELATED APPLICATIONS

This application is a national stage filing under 35 U.S.C. 371 of PCT/US2011/045450, filed Jul. 27, 2011, which claims priority to U.S. Provisional Application Nos. 61/368,792, filed Jul. 29, 2010, and 61/509,827, filed Jul. 20, 2011, the disclosures of which are incorporated by reference herein in their entirety.

BACKGROUND

Oil and natural gas can be produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for the desired recovery of oil and gas. In other cases, during operation of the well, the permeability of the formation drops to the extent that further recovery becomes uneconomical. In such cases, it is common to fracture the formation and prop the fracture in an open condition using a proppant material or propping agent. The proppant material or propping agent is typically a particulate material, such as sand and (man-made) engineered proppants, such as resin coated sand and high-strength ceramic materials (e.g., sintered bauxite, crystalline ceramic bubbles, and ceramic (e.g., glass) beads), which are carried into the fracture by a fluid.

The extreme environments of temperature and pressure in a fracture and exposure to various chemicals in fracturing fluids provide many challenges for proppant materials. While certain crosslinked polymers have been used as proppants, there continues to be interest in finding polymeric materials that can withstand the challenging environment in a fractured formation.

SUMMARY

Particles that typically demonstrate properties that exceed those of commercially available polymer proppant particles are disclosed herein. For example, the particles disclosed herein typically have better performance at elevated temperatures and/or pressure than commercially available polymer proppant particles. For example, the particles disclosed herein can withstand high pressures and temperatures without excessive deformation, creep, or brittle failure. Furthermore, the particles disclosed herein typically have greater resistance to swelling in solvents than commercially available polymer proppant particles. These properties may render the plurality of particles according to the present disclosure more versatile than commercially available materials. For example, when used as proppants the plurality of particles according to the present disclosure may be useful at greater depths in subterranean formations than currently available polymer proppants.

In one aspect, the present disclosure provides a plurality of particles comprising an elastomer-modified crosslinked aromatic epoxy vinyl ester polymer, wherein a particle from the plurality of particles maintains at least 50 percent of its height under a pressure of $1.7 \times 10^7$ Pascals at a temperature of at least 150° C.

In another aspect, the present disclosure provides a method of making such a plurality of particles, the method comprising:
providing a mixture comprising an elastomer-modified aromatic epoxy vinyl ester resin having at least two vinyl ester functional groups, a catalyst, and optionally an accelerator for the catalyst;
suspending the mixture in a solution comprising water to form a suspension; and
initiating crosslinking of the elastomer-modified aromatic epoxy vinyl ester resin to make the plurality of particles.

In another aspect, the present disclosure provides a plurality of mixed particles comprising the plurality of particles according to and/or prepared according to any of the foregoing aspects and other, different particles.

In another aspect, the present disclosure provides a fluid comprising a plurality of particles according to and/or prepared according to any of the foregoing aspects dispersed therein.

In another aspect, the present disclosure provides a method of fracturing a subterranean geological formation penetrated by a wellbore, the method comprising:
injecting into the wellbore penetrating the subterranean geological formation a fracturing fluid at a rate and pressure sufficient to form a fracture therein; and
introducing into the fracture a plurality of particles described above, a plurality of mixed particles described above, or a fluid described above.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The terms "first" and "second" are used in this disclosure. It will be understood that, unless otherwise noted, those terms are used in their relative sense only. For these components, the designation of "first" and "second" may be applied to the components merely as a matter of convenience in the description of one or more of the embodiments.

The term "plurality" refers to more than one. In some embodiments, the plurality of particles disclosed herein comprises at least 2, 10, 100, or 1000 of such particles.

The above summary of the present disclosure is not intended to describe each disclosed embodiment or every implementation of the present disclosure. The description that follows more particularly exemplifies illustrative embodiments. It is to be understood, therefore, that the following description should not be read in a manner that would unduly limit the scope of this disclosure.

DETAILED DESCRIPTION

Crosslinked aromatic epoxy vinyl ester polymers as described herein will be understood to be preparable by crosslinking aromatic epoxy vinyl ester resins. The crosslinked aromatic epoxy vinyl ester polymer typically contains a repeating unit with at least one (in some embodiments, at least 2, in some embodiments, in a range from 1 to 4) aromatic ring (e.g., phenyl group) that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For repeating units containing two or more aromatic rings, the rings may be connected, for example, by a branched or straight-chain alkylene group having 1 to 4 carbon atoms that may optionally be substituted by halogen (e.g., fluoro, chloro, bromo, iodo). The crosslinked aromatic epoxy vinyl ester resin will typically have divalent units represented by formula

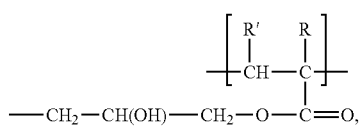

wherein R is hydrogen, methyl, or ethyl, wherein the methyl or ethyl group may optionally be halogenated, wherein R' is hydrogen or phenyl, and wherein the terminal $CH_2$ group is linked directly or indirectly to the aromatic group described above (e.g., through a phenolic ether functional group).

In some embodiments, the crosslinked aromatic epoxy vinyl ester polymer is a novolac epoxy vinyl ester polymer. In these embodiments, the novolac epoxy vinyl ester polymer may be a phenol novolac, an ortho-, meta-, or para-cresol novolac, or a combination thereof. In some embodiments, the crosslinked aromatic epoxy vinyl ester polymer is a bisphenol diglycidyl acrylic or methacrylic polymer, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl.

At least a portion of the crosslinked epoxy vinyl ester polymer useful as a component of the plurality of particles according to present disclosure is elastomer-modified. In this application, an "elastomer-modified" crosslinked epoxy vinyl ester polymer is understood to have an elastomeric segment copolymerized with (that is, covalently bonded to) the crosslinked epoxy vinyl ester. The elastomeric segment can include, for example, a polybutadiene segment, a butadiene copolymer segment such as a butadiene acrylonitrile copolymer segment, polyisoprene segment, and polychloroprene segment, other diene rubber segments including partially or completely hydrogenated diene rubbers, a polybutene segment, a block copolymer (e.g., thermoplastic elastomeric) segment, an ethylene terpolymer segment, a polyurethane rubber segment, or a combination of these. The elastomeric segments in the elastomer-modified crosslinked epoxy vinyl ester polymer provide up to 50 (in some embodiments, up to 40, 30, 25, 20, 15, or 10) percent by weight of the polymer.

Epoxy vinyl ester resins useful for preparing crosslinked epoxy vinyl ester polymers are typically prepared, for example, by reacting a vinyl monocarboxylic acid (e.g., acrylic acid, methacrylic acid, ethacrylic acid, halogenated acrylic or methacrylic acids, cinnamic acid, and combinations thereof) and an aromatic polyepoxide (e.g., a chain-extended diepoxide or novolac epoxy resin having at least two epoxide groups) or a monomeric diepoxide. A crosslinkable epoxy vinyl ester resin therefore typically will have at least two end groups represented by formula —$CH_2$—CH(OH)—$CH_2$—O—C(O)—C(R)=CH(R'), wherein R and R' are as defined above. The aromatic polyepoxide or aromatic monomeric diepoxide typically contains at least one (in some embodiments, at least 2, in some embodiments, in a range from 1 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Exemplary aromatic epoxy resins useful for reaction with vinyl monocarboxylic acids include novolac epoxy resins (e.g., phenol novolacs, ortho-, meta-, or para-cresol novolacs or combinations thereof), bisphenol epoxy resins (e.g., bisphenol A, bisphenol F, halogenated bisphenol epoxies, and combinations thereof), resorcinol epoxy resins, and tetrakis phenylolethane epoxy resins. Exemplary aromatic monomeric diepoxides useful for reaction with vinyl monocarboxylic acids include the diglycidyl ethers of bisphenol A and bisphenol F and mixtures thereof. However, in some embodiments, the aromatic epoxy vinyl ester resin is not solely derived from the monomeric diglycidyl ether of bisphenol A (i.e., the resin is other than bisphenol-A diglycidyl methacrylate). Instead, in some embodiments, bisphenol epoxy resins, for example, may be chain extended to have any desirable epoxy equivalent weight. In some embodiments, the aromatic epoxy resin (e.g., either a bisphenol epoxy resin or a novolac epoxy resin) may have an epoxy equivalent weight of at least 140, 150, 200, 250, 300, 350, 400, 450, or 500 grams per mole. In some embodiments, the aromatic epoxy resin may have an epoxy equivalent weight of up to 2500, 3000, 3500, 4000, 4500, 5000, 5500, or 6000 grams per mole. In some embodiments, the aromatic epoxy resin may have an epoxy equivalent weight in a range from 150 to 6000, 200 to 6000, 200 to 5000, 200 to 4000, 250 to 5000, 250 to 4000, 300 to 6000, 300 to 5000, or 300 to 3000 grams per mole.

In some embodiments, the aromatic epoxy vinyl ester resin is elastomer-modified before it is subjected to crosslinking and particle formation. Such elastomer-modification can be carried out by reacting a reactive elastomer with an aromatic epoxy resin (e.g., any of those described above). In some embodiments, the reactive elastomer has carboxyl end groups, such as in the case of carboxyl-terminated liquid butadiene-acrylonitrile (CTBN) rubbers. Such carboxyl end groups can react with epoxy groups in the aromatic epoxy resin. The epoxy groups can be in excess relative to the carboxyl groups such that the reaction product has remaining epoxy groups. These epoxy groups can then be reacted with a vinyl monocarboxylic acid to prepare an aromatic epoxy vinyl ester resin that is elastomer modified.

In some embodiments, the crosslinked epoxy vinyl ester polymer is a copolymer of an aromatic epoxy vinyl ester resin as described in any of the above embodiments, which may be elastomer-modified as described above, and at least one monofunctional monomer. Exemplary monofunctional monomers useful for preparing such copolymers include vinyl aromatics, acrylates, methacrylates, and vinyl ethers. For example, the monofunctional monomer may comprise at least one of styrene, vinyl toluene, α-methyl styrene, p-chlorostyrene, tert-butyl styrene, methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxyethyl(meth)acrylate, dicyclopentanyl(meth)acrylate, and 3,3,5-trimethylcyclohexyl(meth)acrylate. In some embodiments, the crosslinked aromatic epoxy vinyl ester polymer is a copolymer of an aromatic epoxy vinyl ester resin and styrene.

In some embodiments, the crosslinked epoxy vinyl ester polymer is a copolymer of an aromatic epoxy vinyl ester resin as described in any of the above embodiments, an elastomer-modified aromatic epoxy vinyl ester resin as described above, and optionally a monofunctional monomer as described above.

A plurality of particles comprising a crosslinked aromatic epoxy vinyl ester polymer according to the present disclosure can be made, for example, by suspension polymerization. Typically, a mixture of at least one aromatic epoxy vinyl ester resin having at least two vinyl ester functional groups, a catalyst (e.g., a free-radical initiator), optionally at least one monofunctional monomer, and optionally an accelerator for the catalyst is suspended in a solution comprising water (i.e., an aqueous solution) to form a suspension. At least a portion of the aromatic epoxy vinyl ester resin may be elastomer-modified in a previous step as described above, or the mixture can also contain a reactive oligomer or polymer that provides the elastomeric segment. For example, a reactive oligomer or polymer of polybutadiene, a butadiene copolymer such as a butadiene acrylonitrile polymer or oligomer, other diene rubbers, polybutene, a block copolymer (e.g., thermoplastic elastomer), an ethylene terpolymer, or a combination of these may be used in the reaction mixture. The mixture can be made by stirring the mixture components together before combining the mixture and the aqueous solution. Typically, the suspension is made by stirring the mixture in the aqueous solution to form beads of the mixture suspended in the aqueous solution. An accelerator for the catalyst can also be added to the suspension, for example, if it is not present in the mixture. Initiating crosslinking of the epoxy vinyl ester resin can be carried out, for example, by heating. Heating the suspension at least to the temperature that the catalyst initiates typically will cause the vinyl ester functional groups and any other vinyl groups present to react and crosslink to form the plurality of particles. In some embodiments, for example, when an accelerator is present either in the mixture or in the suspension, heating may not be necessary. Initiating crosslinking of the epoxy vinyl ester resin in these embodiments may be carried out, for example, by adding the accelerator to the suspension and stirring at room temperature without using external heating.

The aromatic epoxy vinyl ester resin or resins that can be polymerized using this method can be any of those described above. For example, in some embodiments, the aromatic epoxy vinyl ester resin comprises a novolac epoxy vinyl ester resin. In these embodiments, the novolac epoxy vinyl ester resin may be a phenol novolac, an ortho-, meta-, or para-cresol novolac, or a combination thereof. In some embodiments, the aromatic epoxy vinyl ester resin comprises a bisphenol diglycidyl acrylic or methacrylic resin, wherein the bisphenol (i.e., —O—$C_6H_5$—$CH_2$—$C_6H_5$—O—) may be unsubstituted (e.g., bisphenol F), or either of the phenyl rings or the methylene group may be substituted by halogen (e.g., fluoro, chloro, bromo, iodo), methyl, trifluoromethyl, or hydroxymethyl. For any of these embodiments, at least a portion of the aromatic epoxy vinyl ester resin may be elastomer modified as described above before it is added to the suspension polymerization mixture.

The optional monofunctional monomer that can be included in the mixture and copolymerized with the aromatic epoxy vinyl ester resin can be any of those described above. The monofunctional monomer may be present in the mixture comprising the aromatic epoxy vinyl ester resin in an amount less than 40 percent by weight. In some embodiments, the monofunctional monomer is present in the mixture in a range from 0 to 39 (in some embodiments, 5 to 39, 10 to 38, 15 to 38, 15 to 37, 20 to 39, 20 to 38, or 20 to 37) percent by weight, based on the total weight of the mixture including the monofunctional monomer and the aromatic epoxy vinyl ester resin. In some embodiments, the mixture comprising the aromatic epoxy vinyl ester resin further comprises styrene. In some of these embodiments, styrene may be present in the mixture comprising the aromatic epoxy vinyl ester resin in an amount ranging from 0 to 39 (in some embodiments, 5 to 39, 10 to 38, 15 to 38, 15 to 37, 20 to 39, 20 to 38, or 20 to 37) percent by weight, based on the total weight of the mixture including styrene and the aromatic epoxy vinyl ester resin.

Several aromatic epoxy vinyl ester resins useful for preparing the plurality of particles according to and/or prepared according to the present disclosure are commercially available. For example, epoxy diacrylates such as bisphenol A epoxy diacrylates and epoxy diacrylates diluted with other acrylates are commercially available, for example, from Cytec Industries, Inc., Smyrna, Ga., under the trade designation "EBECRYL". Aromatic epoxy vinyl ester resins such as novolac epoxy vinyl ester resins diluted with styrene are available, for example, from Ashland, Inc., Covington, Ky., under the trade designation "DERAKANE" (e.g., "DERAKANE 470-300") and from Interplastic Corporation, St. Paul, Minn., under the trade designation "CoREZYN" (e.g., "CoREZYN 8730" and "CoREZYN 8770"). Elastomer-modified aromatic epoxy vinyl ester resins diluted with styrene are available, for example, from Ashland, Inc. under the trade designation "DERAKANE 8084" and from Interplastic Corporation under the trade designation "CoREZYN 8550". It is believed that these elastomer-modified aromatic epoxy vinyl ester resins are bisphenol-A based epoxy vinyl ester resins.

Exemplary useful catalysts include azo compounds (e.g., 2,2'-azobisisobutyronitrile (AIBN), 2,2'-azobis(2-methylbutyronitrile), or azo-2-cyanovaleric acid), hydroperoxides (e.g., cumene, tert-butyl or tert-amyl hydroperoxide), dialkyl peroxides (e.g., di-tert-butyl or dicumylperoxide), peroxyesters (e.g., tert-butyl perbenzoate or di-tert-butyl peroxyphthalate), diacylperoxides (e.g., benzoyl peroxide or lauryl peroxide), methyl ethyl ketone peroxide, and potassium persulfate. Any suitable amount of catalyst may be used, depending on the desired reaction rate. In some embodiments, the amount of catalyst is in a range from 0.1 to 5 (in some embodiments, 0.5 to 3, or 0.5 to 2.5) percent by weight, based on the total weight of the mixture. Suitable exemplary accelerators (e.g., for peroxide catalysts) include tertiary amines such as N,N-dimethyl-p-toluidine and N,N-dimethylaniline. Any suitable amount of accelerator may be used, depending on the catalyst and reaction temperature. In some embodiments, the amount of accelerator is in a range from 0.01 to 2 (in some embodiments, 0.05 to 1, or 0.05 to 0.5) percent by weight, based on the total weight of the mixture.

The temperature to which the suspension is heated can be selected by those skilled in the art based on considerations such as the temperature required for the use of a particular initiator. While it is not practical to enumerate a particular temperature suitable for all initiators, generally suitable temperatures are in a range from about 30° C. to about 200° C. (in some embodiments, from about 40° C. to about 100° C., or from about 40° C. to about 90° C.). Heating can be carried out using a variety of techniques. For example, the suspension can be stirred in a flask that is placed on a hot plate or water bath.

In some embodiments of the method according to the present disclosure, the aqueous solution comprises a suspending agent, which may be either an organic or inorganic suspending agent. Exemplary useful suspending agents include cellulose polymers (e.g., methyl cellulose, carboxy methyl cellulose, carboxymethyl methyl cellulose, hydroxypropyl methyl cellulose, and hydroxybutyl methyl cellulose); gelatin; polyvinylalcohol; partially hydrolyzed polyvinyl alcohol; acrylate polymers and methacrylate polymers (e.g., polymethacrylic acid, sodium poly(methacrylic acid) and ammonium poly(methacrylic acid)); poly(styrene sulfonates) (e.g., sodium poly(styrene sulfonate)); talc; hydroxyapatite; barium sulfate; kaolin; magnesium carbonate; magnesium hydroxide; calcium phosphate; and aluminum hydroxide. While it has been suggested that suspending agents are required to prepare beads of vinyl ester resins (see, e.g., U.S. Pat. No. 4,398,003 (Irwin)), it has been unexpectedly found that the method according to the present disclosure can be carried out in the absence of a suspending agent. Accordingly, in some embodiments of the method of making a plurality of particles according to the present disclosure, the solution comprising water is essentially free of a suspending agent. The solution comprising water may be essentially free of an organic suspending agent, for example. More specifically, the solution comprising water may be essentially free of a cellulose polymer. Solutions that are "essentially free of a suspending agent" include those that are free of (i.e., have no added) suspending agents. Solutions that are "essentially free of a suspending agent" can also include solutions that have less than about 0.1, 0.075, 0.05, 0.025, or 0.01 percent by weight of a suspending agent based on the weight of the solution comprising water before it is combined with the mixture comprising the aromatic epoxy vinyl ester resin.

In some embodiments of the method of making a plurality of particles according to the present disclosure, the method further comprises separating the plurality of particles from the solution comprising water and subjecting the plurality of particles to post-polymerization heating at a temperature of at least 130° C. Separating the plurality of particles can be carried out using conventional techniques (e.g., filtering or decanting). Optionally the suspension can be filtered through at least one sieve to collect a desired graded fraction of the plurality of particles. Post-polymerization heating can advance crosslinking and network formation as described further below. In some embodiments, the particles disclosed herein are subjected to post-polymerization heating at a temperature of at least 135° C. (in some embodiments, at least 140° C., 145° C., 150° C., or 155° C.). Post-polymerization heating can be carried out at any temperature in a range, for example, from 130° C. to 220° C. Post-polymerization heating can conveniently be carried out in an oven, typically for at least 30 minutes, although shorter and longer periods of time may be useful. Post-polymerization heating can be carried out at a single temperature or more than one temperature. For example, the plurality of particles may be heated at 130° C. for a first period of time (e.g., in a range from 15 to 60 minutes) and then at a higher temperature (e.g., in a range from 150° C. to 220° C.) for a second period of time (e.g., in a range from 15 to 60 minutes).

Particles according to the present disclosure typically demonstrate beneficial resistance to deformation. In some embodiments, particles according to the present disclosure can be exposed to pressure (e.g., up to $1.7 \times 10^7$ Pa, $3.4 \times 10^7$ Pa, $5.1 \times 10^7$ Pa, or $6.9 \times 10^7$ Pa) and temperature (e.g., up to 100° C., 110° C., 120° C., 130° C., 140° C., 150° C., 175° C. or higher) while maintaining at least 50 (in some embodiments, 60, 75, or 90 percent) of its height without permanent deformation (i.e., creep) or brittle failure. A particle from the plurality of particles maintains at least 50 percent of its height under a pressure of $1.7 \times 10^7$ Pascals at a temperature of at least 150° C. (in some embodiments, at least 175° C., 180° C., 190° C., or 200° C.). The term height may be understood to be the same as diameter when evaluating substantially spherical particles. In some embodiments of the plurality of particles disclosed herein, any particle within the plurality of particles maintains at least 50 percent of its height under the conditions described above. In some embodiments of the plurality of particles, substantially all of the particles in the plurality of particles may maintain at least 50 percent of their heights under these conditions. Substantially all can mean, for example, at least 90, 95, or 99 percent of the particles in the plurality of particles.

A particle can be evaluated to determine whether it maintains at least 50 percent of its height under a pressure of $1.7 \times 10^7$ Pascals at a temperature of at least 150° C., for example, using a Dynamic Mechanical Analyzer in compression mode. The details of the evaluation are provided in the Examples, below. The pressure is determined by the static force used in the evaluation divided by the cross-sectional area of the particle being evaluated. The results of the evaluation may vary somewhat (e.g., up to a 20% difference in temperature) depending on the size of the particle being evaluated. Therefore, for evaluating the temperature up to which a particle maintains its height under static compression, it is useful to choose a particle from a plurality of particles that has an initial height in a range from 0.5 to 1.5 millimeters. When more than one particle is evaluated, the average temperature obtained from the evaluation will be at least 150° C. (in some embodiments, at least 175° C., 180° C., 190° C., or 200° C.).

A particle from the plurality of particles according to the present disclosure typically maintains at least 50 percent of its height under a pressure of $1.7 \times 10^7$ Pascals up to a higher temperature than the temperature up to which it maintains 75 percent of its height. In some embodiments, a particle from the plurality of particles according to the present disclosure typically maintains at least 50 percent of its height under a pressure of $1.7 \times 10^7$ Pascals up to a second temperature that is at least twenty (in some embodiments, 25, 30, 35, 40, 45, or 50) percent higher than a first temperature, wherein the first temperature is the temperature up to which the particle maintains 75 percent of its height. The percentage can be determined by dividing the difference between the two temperatures in degrees Celsius by the lower temperature value and multiplying by 100. In many embodiments of the plurality of particles disclosed herein, a particle from the plurality of particles maintains at least 75 percent of its height under a pressure of $1.7 \times 10^7$ Pascals up to a temperature of at least 95° C. (in some embodiments, at least 100° C., 105° C., 110° C., or 115° C.).

Particles according to the present disclosure typically demonstrate beneficial resistance to swelling in various solvents. For particles being used as proppants, resistance to swelling in various fluids (e.g., oil, xylene, toluene, methanol, carbon dioxide, and hydrochloric acid) is a desirable product characteristic as excessive swelling and any degradation after exposure to such fluids can negatively impact the ability of the proppants to be injected into a fracture and the ability of the proppants to withstand the temperatures and pressures within the fracture. The plurality of particles according to the present disclosure typically has high resistance to swelling in oil or condensate, aromatics (e.g., xylene and toluene), methanol, carbon dioxide, and hydrochloric acid. In many embodiments of the plurality of particles disclosed herein, a particle from the plurality of particles swells not more than 40 (in some embodiments, not more than 35, 30, 25, or 20) percent by volume when submerged in toluene for 24 hours at 70° C. In some embodiments of the plurality of particles disclosed herein, any particle within the plurality of particles swells not more than 40 (in some embodiments, not more than 35, 30, 25, or 20) percent by volume when submerged in toluene for 24 hours at 70° C. In some embodiments of the plurality of particles, substantially all of the particles in the plurality of particles may exhibit the indicated resistance to swelling in toluene. Substantially all can mean, for example, at least 90, 95, or 99 percent of the particles in the plurality of particles. For the purposes of the present disclosure, the percent volume swelling is determined by measuring the diameter of a sample of particles using a microscope. Details of the evaluation are provided in the Examples, below.

Epoxy vinyl ester resins have been generally described as resins that may be useful for forming thermoset beads for use as proppants. See, for example, U.S. Pat. Appl. Pub. Nos. 2007/0021309 (Bicerano), 2007/0181302 (Bicerano), 2007/0066491 (Bicerano et al.), 2007/0161515 (Bicerano), and 2007/0144736 (Shinbach et al.). However, the art does not describe a plurality of particles made from epoxy vinyl ester resins that have a deformation resistance wherein a particle from the plurality of the particles maintains at least 50 percent of its height when placed under a pressure of $1.7 \times 10^7$ Pascals up to a temperature of at least 150° C. (in some embodiments, at least 175° C., 180° C., 190° C., or 200° C.). As shown in the Examples, below, not all particles exhibit this level of deformation resistance. For example, not all currently commercially available polymer proppant particles exhibit this deformation resistance. Furthermore, not all elastomer-modified crosslinked epoxy vinyl ester polymer particles exhibit this deformation resistance. While impact modifiers have been proposed to be useful in thermoset polymer beads for preventing brittle failure in a fracture, the Examples below demonstrate that particles of some elastomer-modified crosslinked epoxy vinyl ester polymers do not maintain 50 percent of their height under a pressure of $1.7 \times 10^7$ Pascals even at a temperature of 135° C. or lower. The level of deformation resistance achieved by the plurality of particles according to the present disclosure is therefore surprisingly high when considering commercially available proppant particles and other particles in the class of epoxy vinyl ester particles.

Also, the art listed above does not describe a plurality of particles made from epoxy vinyl ester resins, wherein a particle from the plurality of particles swells not more than 40 (in some embodiments, not more than 35, 30, 25, or 20) percent by volume when submerged in toluene for 24 hours at 70° C. As shown in the Examples, below, not all particles exhibit this level of resistance to swelling. For example, currently commercially available polymer proppant particles do not exhibit this resistance to swelling in toluene. Furthermore, not all elastomer-modified crosslinked epoxy vinyl ester polymer particles exhibit this feature. The level of resistance to swelling in toluene achieved by the plurality of particles according to the present disclosure is therefore surprisingly high when considering commercially available proppant particles and other particles in the class of epoxy vinyl ester particles.

We have found that a blend of an elastomer-modified aromatic epoxy vinyl ester resin and a second aromatic epoxy vinyl ester resin that is not elastomer-modified is useful for providing elastomer-modified crosslinked aromatic epoxy vinyl ester polymer particles that maintain at least 50 percent of their height when placed under a pressure of $1.7 \times 10^7$ Pascals at a temperature of at least 150° C. The second aromatic epoxy vinyl ester resin may be selected, for example, to increase the crosslink density of the final elastomer-modified crosslinked aromatic epoxy vinyl ester polymer. To increase the crosslink density in the final crosslinked polymer, the second aromatic epoxy vinyl ester resin may be a novolac epoxy vinyl ester resin, may have a lower level of a monofunctional monomer than the elastomer-modified aromatic epoxy vinyl ester resin, may have an added chemical crosslinker, or a combination of these features.

The amount of monofunctional monomer contained in the initial aromatic epoxy vinyl ester resin or resins influences the deformation resistance and solvent resistance of the resultant crosslinked particles. As shown in the Examples and Illustrative Examples, below, as the styrene content in the starting resin is increased, the temperature up to which a particle from the plurality of particles maintains 50 percent of its height under a pressure of $1.7 \times 10^7$ Pascals (2500 psi) decreases, indicating a decreased resistance to deformation. Similarly, as the styrene content in the starting resin increases, the percent volume increase of a particle after being submerged in toluene for 24 hours at 70° C. also increases. The amount of styrene that can be tolerated in the initial aromatic epoxy vinyl ester resin mixture while maintaining a high deformation resistance and high solvent resistance varies with the selection of aromatic epoxy vinyl ester resin or resin blend. For example, resin blends containing novolac epoxy vinyl ester resins and/or elastomer-modified novolac epoxy vinyl ester resins combined with a certain amount of styrene may provide crosslinked particles with better deformation resistance and solvent resistance than resin blends containing only elastomer-modified bisphenol A epoxy vinyl ester resins and optionally bisphenol A epoxy vinyl ester resins combined with the same amount of styrene. In some embodiments, the styrene is present in combination with the elastomer-modified aromatic epoxy vinyl ester resin and the second aromatic epoxy vinyl ester resin in an amount less than 40 (in some embodiments, up to 39, 38, 37, 36, or 35) percent by weight, based on the total weight of the styrene, the elastomer-modified aromatic epoxy vinyl ester resin, and the second aromatic epoxy vinyl ester resin. Similarly, in some embodiments of the proppant particle, copolymerized styrene is present in an amount less than 40 (in some embodiments, up to 39, 38, 37, 36, or 35) percent by weight, based on the total weight of the elastomer-modified crosslinked copolymer in the plurality of particles.

The amount of monofunctional monomer contained in the initial aromatic epoxy vinyl ester resin is believed to relate to the amount of crosslinking (i.e., crosslink density) in the resultant particles. Relative comparisons of crosslink density in a thermoset polymer can be made by solvent swelling, for example, using the evaluation of a particle from the plurality of particles for swelling in toluene disclosed herein.

Another factor that can influence the deformation resistance and solvent resistance of the plurality of particles disclosed herein is a post-polymerization heating step. Post-polymerization heating can advance crosslinking and network formation. Therefore, it may increase crosslink density. In some embodiments, the particles disclosed herein are subjected to post-polymerization heating at a temperature of at least 130° C. (in some embodiments, at least 140° C., 145° C., 150° C., or 155° C.).

Another factor that can influence the deformation resistance and solvent resistance of the plurality of particles disclosed herein is the presence of a plasticizer. In some embodiments, the elastomer-modified aromatic epoxy vinyl ester polymer is essentially free of plasticizer. "Essentially free of plasticizer" can mean that the particles have no added plasticizer. "Essentially free of plasticizer" can also mean that the particles have a plasticizer at a level insufficient to change the compression properties of the particles. For example, the crosslinked aromatic epoxy vinyl ester polymer may comprise up to one (in some embodiments, 0.75, 0.5, 0.25, or 0.1) percent by weight of a plasticizer, based on the total weight of the particles.

In some embodiments, the plurality of particles disclosed herein comprises at least one filler. In some embodiments, the filler comprises at least one of glass microbubbles, glass microspheres, silica (e.g., including nanosilica), calcium carbonate (e.g., calcite or nanocalcite), ceramic microspheres, aluminum silicate (e.g., kaolin, bentonite clay, wollastonite), carbon black, mica, micaceous iron oxide, aluminum oxide, or feldspar. In some embodiments, the filler comprises aluminum silicate, which may be a functionalized clay (e.g., an organo-functionalized calcined kaolin clay).

Glass microbubbles are known in the art and can be obtained commercially and/or be made by techniques known in the art (see, e.g., U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); U.S. Pat. No. 4,391,646 (Howell); and U.S. Pat. No. 4,767,726 (Marshall); and U.S. Pat. App. Pub. No. 2006/0122049 (Marshall et. al). Useful glass microbubbles include those marketed by Potters Industries, Valley Forge, Pa., (an affiliate of PQ Corporation) under the trade designation "SPHERICEL HOLLOW GLASS SPHERES" (e.g., grades 110P8 and 60P18) and glass bubbles marketed by 3M Company, St. Paul, Minn., under the trade designation "3M GLASS BUBBLES" (e.g., grades S60, S60HS, and iM30K). Glass microspheres are available, for example, from Diversified Industries, Sidney, British Columbia, Canada; and 3M Company. Useful ceramic microspheres include those marketed by 3M Company under the trade designation "3M CERAMIC MICROSPHERES" (e.g., grades W-610).

When fillers are incorporated into the plurality of particles disclosed herein, typically the crosslinked aromatic epoxy vinyl ester polymer remains the continuous phase. That is, the filler is typically incorporated into and surrounded by the crosslinked polymer matrix. In some embodiments, the crosslinked aromatic epoxy vinyl ester polymers disclosed herein have up to 40, 35, 30, 25, or 20 percent by weight filler, based on the total weight of the particles. It is generally thought in the art that fillers may be useful for improving the properties of some thermoset polymer beads, for example, the stiffness and strength of the beads. Typically, and surprisingly, we have found that the crosslinked aromatic epoxy vinyl ester polymers disclosed herein have excellent static compression resistance even in the absence of fillers. In fact, in some embodiments, the crosslinked aromatic epoxy vinyl ester polymer beads may have better properties in the absence of a filler than in the presence of a filler. For example, typically a particle from the plurality of particles maintains at least 50 percent of its height under a pressure of $1.7 \times 10^7$ Pascals up to a higher temperature in the absence of filler than in the presence of filler. Accordingly, in some embodiments, the crosslinked aromatic epoxy vinyl ester polymer is essentially free of fillers (in some embodiments, essentially free of inorganic filler or nanofiller). "Essentially free of fillers" (e.g., inorganic filler or nanofiller) can mean that the particles have no added fillers, e.g., fillers such as glass microbubbles, glass microspheres, silica (e.g., including nanosilica), calcium carbonate (e.g., calcite, nanocalcite), ceramic microspheres, aluminum silicate (e.g., kaolin, bentonite clay, or wollastonite), carbon black, mica, micaceous iron oxide, aluminum oxide, and feldspar. "Essentially free of fillers" (e.g., inorganic filler or nanofiller) can also mean that the particles have filler at a level insufficient to significantly change the physical properties of the particles. For example, the crosslinked aromatic epoxy vinyl ester polymer may comprise up to one (in some embodiments, 0.75, 0.5, 0.25, or 0.1) percent by weight of filler, based on the total weight of the particles.

The incorporation of fillers, among other techniques, may be useful for altering the density of a particle from the plurality of particles disclosed herein. In some embodiments, the density of the particles disclosed herein is in a range from 0.6 to 1.5 (in some embodiments, 0.7 to 1.5, 0.95 to 1.3, or 1 to 1.2) grams per cubic centimeter. The density of the particles in the plurality of particles may be adjusted to match the density of a fluid into which they are dispersed, for example, in a fracturing and propping operation. This allows the proppant particles to travel further into a fracture with minimal input of energy, which can result in a several-fold increase in effective fracture conductivity and accompanying enhanced oil recovery.

While the plurality of particles disclosed herein can include fillers, it should be understood that the particles comprising the elastomer-modified crosslinked aromatic epoxy vinyl ester polymer are not typically particles having a ceramic core coated with the crosslinked aromatic epoxy vinyl ester polymer. In other words, the particles disclosed herein typically do not belong to the category of resin-coated proppants or resin-coated sand. Instead, the particles disclosed herein may be understood to belong to the class of polymer beads or proppants. The elastomer-modified crosslinked aromatic epoxy vinyl ester polymer forms part of the core and the exterior of the particles. It may be understood that the polymer and optionally any fillers may be distributed throughout the particles.

Advantages of the plurality of particles disclosed herein include that they are relatively low in density yet provide relatively high deformation resistances up to high temperatures and high resistance to swelling. Because of their relatively low density, they can be used with lower viscosity, cheaper carrier fluids (described below). Their high deformation resistance and high temperature performance renders them useful, for example, in fractures at depths of at least 500, 1000, 1500, 2000, 2500, 3000, 3500, 4000, 4500, or 5000 meters. The plurality of particles disclosed herein may be useful as fracture proppants at depths, for example, up to 8000, 7500, 7000, 6500, or 6000 meters. These depths may correspond, for example, to closure pressures in a range from 500 psi to 15,000 psi ($3.4 \times 10^7$ Pa to $1.0 \times 10^8$ Pa).

Typically, the plurality of particles according to the present disclosure comprises particles with a size in a range from 100 micrometers to 3000 micrometers (i.e., about 140 mesh to about 5 mesh (ANSI)) (in some embodiments, in a range from 1000 micrometers to 3000 micrometers, 1000 micrometers to 2000 micrometers, 1000 micrometers to 1700 micrometers (i.e., about 18 mesh to about 12 mesh), 850 micrometers to 1700 micrometers (i.e., about 20 mesh to about 12 mesh), 850 micrometers to 1200 micrometers (i.e., about 20 mesh to about 16 mesh), 600 micrometers to 1200 micrometers (i.e., about 30 mesh to about 16 mesh), 425 micrometers to 850 micrometers (i.e., about 40 mesh to about 20 mesh), or 300 micrometers to 600 micrometers (i.e., about 50 mesh to about 30 mesh). In some embodiments of the plurality of particles disclosed herein, any particle within the plurality of particles has a size that can be within one of these embodiment ranges.

In some embodiments of the plurality of particles, substantially all of the particles in the plurality of particles can be within one of these embodiment size ranges. Substantially all can mean, for example, not more than 0.1 weight % of the particulates are larger than the larger size and not more than 2 or 1 weight % are smaller than the smaller size. The size of the plurality of particles is typically controlled by the stirring rate during suspension polymerization described above. High shear forces in the suspension result in smaller particle sizes. Desired graded fractions of the plurality of particles may be obtained using conventional classification techniques (e.g., sieving). The size of the particles desired may depend, for example, on the characteristics of a subterranean formation selected for a fracturing and propping operation.

The shape of the particles in the plurality of particles disclosed herein is typically at least somewhat spherical although the sphericity of the particles is not critical to this disclosure. The plurality of particles disclosed herein will typically meet or exceed the standards for sphericity and roundness as measured according to American Petroleum Institute Method RP56, "Recommended Practices for Testing Sand Used in Hydraulic Fracturing Operations", Section 5, (Second Ed., 1995) (referred to herein as "API RP 56"). As used herein, the terms "sphericity" and "roundness" are defined as described in the API RP's and can be determined using the procedures set forth in the API RP's. In some embodiments, the sphericity of any particle in the plurality of particles is at least 0.6 (in some embodiments, at least 0.7, 0.8, or 0.9). In some embodiments, the roundness of any particle in the plurality of particles is at least 0.6 (in some embodiments, at least 0.7, 0.8, or 0.9).

The present disclosure provides plurality of mixed particles comprising the plurality of particles disclosed herein and other particles. The other particles may be conventional proppant materials such as at least one of sand, resin-coated sand, graded nut shells, resin-coated nut shells, sintered bauxite, particulate ceramic materials, glass beads, and particulate thermoplastic materials. Sand particles are available, for example, from Badger Mining Corp., Berlin, Wis.; Borden Chemical, Columbus, Ohio; Fairmont Minerals, Chardon, Ohio. Thermoplastic particles are available, for example, from the Dow Chemical Company, Midland, Mich.; and Baker Hughes, Houston, Tex. Clay-based particles are available, for example, from CarboCeramics, Irving, Tex.; and Saint-Gobain, Courbevoie, France. Sintered bauxite ceramic particles are available, for example, from Borovichi Refractories, Borovichi, Russia; 3M Company, St. Paul, Minn.; CarboCeramics; and Saint Gobain. Glass beads are available, for example, from Diversified Industries, Sidney, British Columbia, Canada; and 3M Company. Generally, the sizes of other particles may be in any of the size ranges described above for the plurality of proppant particles disclosed herein. Mixing other particles (e.g., sand) and the plurality of particles disclosed herein may be useful, for example, for reducing the cost of proppant particles while maintaining at least some of the beneficial properties of the plurality of particles disclosed herein.

In some embodiments, the plurality of particles disclosed herein is dispersed in a fluid. The fluid may be a carrier fluid useful, for example, for depositing proppant particles into a fracture. A variety of aqueous and non-aqueous carrier fluids can be used with the plurality of particles disclosed herein. In some embodiments, the fluid comprises at least one of water, a brine, an alcohol, carbon dioxide (e.g., gaseous, liquid, or supercritical carbon dioxide), nitrogen gas, or a hydrocarbon. In some embodiments, the fluid further comprises at least one of a surfactant, rheological modifier, salt, gelling agent, breaker, scale inhibitor, dispersed gas, or other particles.

Illustrative examples of suitable aqueous fluids and brines include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof. Rheological modifiers may be added to aqueous fluid to modify the flow characteristics of the fluid, for example. Illustrative examples of suitable water-soluble polymers that can be added to aqueous fluids include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum Arabic, carrageenan, as well as any combination thereof. Such polymers may crosslink under downhole conditions. As the polymer undergoes hydration and crosslinking, the viscosity of the fluid increases, which may render the fluid more capable of carrying the proppant. Another class of rheological modifier is viscoelastic surfactants ("VES's").

Exemplary suitable non-aqueous fluids useful for practicing the present disclosure include alcohols (e.g., methanol, ethanol, isopropanol, and other branched and linear alkyl alcohols); diesel; raw crude oils; condensates of raw crude oils; refined hydrocarbons (e.g., gasoline, naphthalenes, xylenes, toluene and toluene derivatives, hexanes, pentanes, and ligroin); natural gas liquids; gases (e.g., carbon dioxide and nitrogen gas); liquid carbon dioxide; supercritical carbon dioxide; liquid propane; liquid butane; and combinations thereof. Some hydrocarbons suitable for use as such fluids can be obtained, for example, from SynOil, Calgary, Alberta, Canada under the trade designations "PLATINUM", "TG-740", "SF-770", "SF-800", "SF-830", and "SF-840". Mixtures of the above non-aqueous fluids with water (e.g., mixtures of water and alcohol or several alcohols or mixtures of carbon dioxide (e.g., liquid carbon dioxide) and water) may also be useful for practicing the present disclosure. Mixtures can be made of miscible or immiscible fluids. Rheological modifiers (e.g., a phosphoric acid ester) can be useful in non-aqueous fluids as well. In some of these embodiments, the fluid further comprises an activator (e.g., a source of polyvalent metal ions such as ferric sulfate, ferric chloride, aluminum chloride, sodium aluminate, and aluminum isopropoxide) for the gelling agent.

Fluid containing a plurality of particles according to the present disclosure dispersed therein can also include at least one breaker material (e.g., to reduce viscosity of the fluid once it is in the well). Examples of suitable breaker materials include enzymes, oxidative breakers (e.g., ammonium peroxydisulfate), encapsulated breakers such as encapsulated potassium persulfate (e.g., available, for example, under the trade designation "ULTRAPERM CRB" or "SUPERULTRAPERM CRB", from Baker Hughes), and breakers described in U.S. Pat. No. 7,066,262 (Funkhouser).

Fluids having a plurality of particles according to the present disclosure dispersed therein may also be foamed. Foamed fluids may contain, for example, nitrogen, carbon dioxide, or mixtures thereof at volume fractions ranging from 10% to 90% of the total fluid volume.

The fluids described above, in any of their embodiments, may be useful, for example, for practicing the method of fracturing a subterranean geological formation penetrated by a wellbore according to the present disclosure. Techniques for fracturing subterranean geological formations comprising hydrocarbons are known in the art, as are techniques for introducing proppants into the fractured formation to prop open fracture openings. In some methods, a fracturing fluid is injected into the subterranean geological formation at rates and pressures sufficient to open a fracture therein. When injected at the high pressures exceeding the rock strength, the fracturing fluid opens a fracture in the rock. The fracturing fluid may be an aqueous or non-aqueous fluid having any of the additives described above. Particles described herein can be included in the fracturing fluid. That is, in some embodiments, injecting the fracturing fluid and introducing the plurality of particles are carried out simultaneously. In other embodiments, the plurality of particles disclosed herein may be present in a second fluid (described in any of the above embodiments) that is introduced into the well after the fracturing fluid is introduced. As used herein, the term "introducing" (and its variants "introduced", etc.) includes pumping, injecting, pouring, releasing, displacing, spotting, circulating, or otherwise placing a fluid or material (e.g., proppant particles) within a well, wellbore, fracture or subterranean formation using any suitable manner known in the art. The plurality of particles according to the present disclosure can serve to hold the walls of the fracture apart after the pumping has stopped and the fracturing fluid has leaked off or flowed back. The plurality of particles according to the present disclosure may also be useful, for example, in fractures produced by etching (e.g., acid etching). Fracturing may be carried out at a depth, for example, in a range from 500 to 8000 meters, 1000 to 7500 meters, 2500 to 7000 meters, or 2500 to 6000 meters.

The carrier fluid carries particles into the fractures where the particles are deposited. If desired, particles might be color coded and injected in desired sequence such that during transmission of subject fluid therethrough, the extracted fluid can be monitored for presence of particles. The presence and quantity of different colored particles might be used as an indicator of what portion of the fractures are involved as well as indicate or presage possible changes in transmission properties.

SELECTED EMBODIMENTS OF THE DISCLOSURE

In a first embodiment, the present disclosure provides a plurality of particles comprising an elastomer-modified crosslinked aromatic epoxy vinyl ester polymer, wherein a particle from the plurality of particles maintains at least 50 percent of its height under a pressure of $1.7 \times 10^7$ Pascals at a temperature of at least 150° C.

In a second embodiment, the present disclosure provides a plurality of particles according to the first embodiment, wherein the particle swells not more than 40 percent by volume when submerged in toluene for 24 hours at 70° C.

In a third embodiment, the present disclosure provides a plurality of particles according to the first or second embodiment, wherein the particle from the plurality of particles maintains at least 75 percent of its height under a pressure of $1.7 \times 10^7$ Pascals at a temperature of at least 100° C.

In a fourth embodiment, the present disclosure provides a plurality of particles according to any one of the first to third embodiments, wherein the particle maintains 50 percent of its height under a pressure of $1.7 \times 10^7$ Pascals up to a second temperature that is at least twenty percent higher than a first temperature, wherein the first temperature is the temperature up to which the particle maintains 75 percent of its height.

In a fifth embodiment, the present disclosure provides a plurality of particles according to any one of the first to fourth embodiments, the elastomer-modified crosslinked aromatic epoxy vinyl ester polymer is an elastomer-modified novolac epoxy vinyl ester polymer.

In a sixth embodiment, the present disclosure provides a plurality of particles according to any one of the first to fourth embodiments, wherein the elastomer-modified crosslinked aromatic epoxy vinyl ester polymer is an elastomer-modified bisphenol diglycidyl acrylic or methacrylic polymer.

In a seventh embodiment, the present disclosure provides a plurality of particles according to any one of the first to sixth embodiments, wherein the elastomer-modified crosslinked aromatic epoxy vinyl ester polymer is a copolymer of an elastomer-modified aromatic epoxy vinyl ester resin, optionally a second aromatic epoxy vinyl ester resin that is not elastomer-modified, and at least one of a vinyl aromatic compound or a monofunctional acrylate or methacrylate.

In an eighth embodiment, the present disclosure provides a plurality of particles according to the seventh embodiment, wherein the elastomer-modified crosslinked aromatic epoxy vinyl ester polymer is a copolymer of an elastomer-modified aromatic epoxy vinyl ester resin, optionally a second aromatic epoxy vinyl ester resin that is not elastomer-modified, and styrene, wherein the styrene is present in an amount less than 40 percent by weight, based on the total weight of the copolymer.

In a ninth embodiment, the present disclosure provides a plurality of particles according to any one of the first to eighth embodiments, further comprising at least one of glass microbubbles, glass microspheres, silica, calcium carbonate, ceramic microspheres, aluminum silicate, carbon black, mica, micaceous iron oxide, aluminum oxide, or feldspar dispersed within the elastomer-modified crosslinked aromatic epoxy vinyl ester polymer.

In a tenth embodiment, the present disclosure provides a plurality of particles according to the ninth embodiment, wherein the plurality of particles comprise at least one of glass microbubbles, glass microspheres, or ceramic microspheres.

In an eleventh embodiment, the present disclosure provides a plurality of particles according to any one of the first to tenth embodiments, wherein the elastomer-modified crosslinked aromatic epoxy vinyl ester polymer is essentially free of inorganic filler.

In a twelfth embodiment, the present disclosure provides a plurality of particles according to any one of the first to eleventh embodiments, wherein the elastomer-modified crosslinked aromatic epoxy vinyl ester polymer is essentially free of nanofiller.

In a thirteenth embodiment, the present disclosure provides a plurality of particles according to the eleventh or twelfth embodiment, wherein the temperature at which the particle from the plurality of particles maintains at least 50 percent of its height under a pressure of $1.7 \times 10^7$ Pascals is at least 175° C.

In a fourteenth embodiment, the present disclosure provides a plurality of particles according to any one of the first to thirteenth embodiments, wherein a particle from the plurality of particles has a density in a range from 0.6 to 1.5 grams per cubic centimeter.

In a fifteenth embodiment, the present disclosure provides a plurality of mixed particles comprising the plurality of particles according to any one of the first to fourteenth embodiments and other, different particles.

In a sixteenth embodiment, the present disclosure provides the plurality of particles according to the fifteenth embodiment, wherein the other particles comprise at least one of sand, resin-coated sand, graded nut shells, resin-coated nut shells, sintered bauxite, particulate ceramic materials, glass beads, and particulate thermoplastic materials.

In a seventeenth embodiment, the present disclosure provides the plurality of particles according to the sixteenth embodiment, wherein the other particles comprise at least one of sand or resin-coated sand.

In an eighteenth embodiment, the present disclosure provides a fluid comprising a plurality of particles according to any one of embodiments 1 to 14 or the plurality of mixed particles according to any one of embodiments 15 to 17 dispersed therein.

In a nineteenth embodiment, the present disclosure provides a fluid according to the eighteenth embodiment, wherein the fluid comprises at least one of water, a brine, an alcohol, carbon dioxide, nitrogen gas, or a hydrocarbon.

In a twentieth embodiment, the present disclosure provides a fluid according to the eighteenth or nineteenth embodiment, further comprising at least one of a surfactant, rheological modifier, salt, gelling agent, breaker, scale inhibitor, or dispersed gas.

In a twenty-first embodiment, the present disclosure provides a method of fracturing a subterranean geological formation penetrated by a wellbore, the method comprising:
  injecting into the wellbore penetrating the subterranean geological formation a fracturing fluid at a rate and pressure sufficient to form a fracture therein; and
  introducing into the fracture a plurality of particles according to any one of the first to fourteenth embodiments, a plurality of mixed particles according to any one of the fifteenth to seventeenth embodiments, or a fluid according to any one of the eighteenth to twentieth embodiments.

In a twenty-second embodiment, the present disclosure provides a method according to the twenty-first embodiment, wherein injecting the fracturing fluid and introducing the plurality of particles are carried out simultaneously, and wherein the fracturing fluid comprises the plurality of particles.

In a twenty-third embodiment, the present disclosure provides a method according to the twenty-first or twenty-second embodiment, wherein the fracturing is carried out at a depth of at least 500 meters.

In a twenty-fourth embodiment, the present disclosure provides a method of making a plurality of particles according to any one of the first to fourteenth embodiments, the method comprising:
  providing a mixture comprising an elastomer-modified aromatic epoxy vinyl ester resin having at least two vinyl ester functional groups, a catalyst, and optionally an accelerator for the catalyst;
  suspending the mixture in a solution comprising water to form a suspension; and
  initiating crosslinking of the elastomer-modified aromatic epoxy vinyl ester resin to make the plurality of particles.

In a twenty-fifth embodiment, the present disclosure provides a method according to the twenty-fourth embodiment, wherein the solution comprising water further comprises at least one of a cellulose polymer, gelatin, polyvinylalcohol, partially hydrolyzed polyvinyl alcohol, an acrylic acid or methacrylic acid polymer, a poly(styrene sulfonate), talc, hydroxyapatite, barium sulfate, kaolin, magnesium carbonate, magnesium hydroxide, calcium phosphate, or aluminum hydroxide as a suspending agent.

In a twenty-sixth embodiment, the present disclosure provides a method according to the twenty-fifth embodiment, wherein the solution comprising water is essentially free of a suspending agent.

In a twenty-seventh embodiment, the present disclosure provides a method according to any one of the twenty-fourth to twenty-sixth embodiments, further comprising:
  separating the plurality of particles from the solution comprising water; and
  subjecting the plurality of particles to post-polymerization heating at a temperature of at least 130° C.

In a twenty-eighth embodiment, the present disclosure provides a method according to any one of the twenty-fourth to twenty-seventh embodiments, wherein the elastomer-modified aromatic epoxy vinyl ester resin is an elastomer-modified novolac epoxy vinyl ester resin.

In a twenty-ninth embodiment, the present disclosure provides a method according to any one of the twenty-fourth to twenty-seventh embodiments, wherein the elastomer-modified aromatic epoxy vinyl ester resin is an elastomer-modified bisphenol diglycidyl acrylate or methacrylate resin.

In a thirtieth embodiment, the present disclosure provides a method according to any one of the twenty-fourth to twenty-ninth embodiments, wherein the mixture further comprises a second aromatic epoxy vinyl ester resin that is not elastomer-modified.

In a thirty-first embodiment, the present disclosure provides a method according to any one of the twenty-fourth to thirtieth embodiments, wherein the mixture further comprises at least one of a vinyl aromatic compound or a monofunctional acrylate or methacrylate.

In a thirty-second embodiment, the present disclosure provides a method according to the thirty-first embodiment, wherein the vinyl aromatic compound is styrene, and wherein the styrene is present in an amount less than 40 percent by weight, based on the total weight of the styrene, the elastomer-modified aromatic epoxy vinyl ester resin, and any second aromatic epoxy vinyl ester resin that is not elastomer-modified.

In a thirty-third embodiment, the present disclosure provides a plurality of particles according to any one of the first to fourteenth embodiments, wherein the plurality of particles have been subjected to post-polymerization heating at a temperature of at least 130° C.

In a thirty-fourth embodiment, the present disclosure provides a plurality of particles according to any one of the first to fourteenth embodiments or the thirty-third embodiment, wherein the particle maintains at least 50 percent of its height under a pressure of $1.7 \times 10^7$ Pascals at a temperature of at least 200° C.

In order that this disclosure can be more fully understood, the following examples are set forth. It should be understood that these examples are for illustrative purposes only, and are not to be construed as limiting this disclosure in any manner.

EXAMPLES

In these examples, all percentages, proportions and ratios are by weight unless otherwise indicated. These abbreviations are used in the following examples: g=gram, min=minutes, in =inch, m=meter, cm=centimeter, mm=millimeter, and ml=milliliter.

Materials

"DERAKANE 470-300" is a trade designation for a Novolac epoxy-based vinyl ester resin commercially available from Ashland, Inc. Covington, Ky., with 33% styrene content.

"DERAKANE 8084" is a trade designation for an elastomer modified epoxy vinyl ester resin commercially available from Ashland with 40% styrene content.

"CoREZYN 8730" is a trade designation for a Novolac epoxy-based vinyl ester resin commercially available from Interplastic Corporation, St. Paul, Minn., with 35.4% styrene content.

"CoREZYN 8770" is a trade designation for an epoxy vinyl ester resin commercially available from Interplastic Corporation with 27% styrene content.

"LUPEROX A98" is a trade designation for benzoyl peroxide commercially available from Arkema, Inc., Philadelphia, Pa.

An aqueous solution of 1% poly(vinyl alcohol) with a molecular weight of $M_w$=124,000-186,000 and 87-89% hydrolyzed was commercially obtained from Sigma Aldrich, St. Louis, Mo.

"CoREZYN 8550" is a trade designation for a rubber-modified epoxy-based vinyl ester resin commercially available from Interplastic Corporation with 40% styrene content.

"MFE-9" is a trade designation for a high-toughness bisphenol A epoxy vinyl ester resin commercially available from Huachang Polymer, Shanghai, China, with 37 to 45% styrene content.

"POLYFIL WC" is a trade designation for an organo-functional calcined kaolin clay commercially available from KaMin, Macon, Ga.

"NUCAP 290W" is a trade designation for a sulfur-functional hydrated aluminum silicate commercially available from KaMin.

Composition A was prepared by adding epoxy vinyl ester resin "DERAKANE 8084" to a round bottom flask in a 50° C. oil bath. The resin was stirred with a magnetic stirbar under high vacuum for one hour. The sample lost 28% of its weight believed to be attributable to styrene, and the new styrene content was calculated to be 17%.

Test Methods:

Static Compression:

A Q800 Dynamic Mechanical Analyzer (available from TA Instruments, New Castle, Del.) was used in compression mode to determine the compression resistance of single proppant particles under a static load as a function of temperature. Individual beads of each sample were placed between compression plates at room temperature. The static compressive force was ramped at 4 N/min to a force sufficient to provide $1.7 \times 10^7$ Pascals of pressure as calculated by Pressure=Force/[(bead radius)×(bead radius)×pi)]. While holding this static force, temperature was ramped to 250° C. at a rate of 3° C./min. The sample height was indicated by the plate separation and was monitored as a function of temperature, and temperatures at which the sample height decreased to 75% and 50% of its original value were recorded.

Swelling Evaluation:

Three beads from each sample were submerged in excess toluene and then immediately imaged with a microscope (model "SteREO Lumar V12" commercially available from Carl Zeiss, Oberkochen, Germany) to record initial diameters. The submerged samples were subsequently placed in an oven at 70° C. for 24 hours. The samples were removed from the oven and allowed to cool down to room temperature before being imaged again. The difference in diameter was used to calculate % volume increase in each sample.

Illustrative Examples 1 and 2 and Examples 1-5

Approximately 300 mL of an aqueous solution of 1% poly (vinyl alcohol) were placed in a jacketed glass reactor. Nitrogen gas was purged through the reactor headspace. A 60° C. solution of ethylene glycol in water was circulated through the reactor jacket. The solution in the jar was stirred with a mixer equipped with a paddle stirrer. Benzoyl peroxide "LUPEROX A98" (1 wt % relative to the weight of vinyl ester resin) was dissolved in at least one vinyl ester resin, and fillers, if used, were then mixed in. N,N-dimethylaniline (0.15 wt % relative to the vinyl ester resins) was added to the reactor followed by immediate addition of the vinyl ester resin mixture. Mechanical stirring was sustained for one hour. The resulting beads were collected by filtration and rinsed with water. The beads were then post-cured in an oven set at 155° C. for 30 min. The vinyl ester resins and any fillers used in Illustrative Examples 1 and 2 and Examples 1-5 and their amounts are shown in Table 1, below. The amount of styrene shown in Table 1 for Illustrative Example 2 and Examples 1 to 5 is calculated from the reported amount of styrene for each resin, shown above.

TABLE 1

| | Vinyl Ester Resin 1 | Amount of Resin 1 (g) | Vinyl Ester Resin 2 | Amount of Resin 2 (g) | Styrene content in resin (wt %) | Filler | Amount of filler (g) |
|---|---|---|---|---|---|---|---|
| Ill. Ex. 1 | "MFE-9" | 40 | None | — | 37-45 | None | — |
| Ill. Ex. 2 | "DERAKANE 8084" | 20 | "CoREZYN 8770" | 20 | 34 | "NUCAP 290W" | 4 |
| Ex. 1 | "DERAKANE 8084" | 20 | "CoREZYN 8770" | 20 | 34 | "POLYFIL WC" | 2 |
| Ex. 2 | "DERAKANE 8084" | 20 | "CoREZYN 8770" | 20 | 34 | "POLYFIL WC" | 6 |
| Ex. 3 | "CoREZYN 8550" | 20 | "CoREZYN 8770" | 20 | 34 | "POLYFIL WC" | 6 |
| Ex. 4 | "CoREZYN 8550" | 20 | "CoREZYN 8770" | 20 | 34 | "POLYFIL WC" | 8 |
| Ex. 5 | "DERAKANE 8084" | 18.5 | "DERAKANE 470-300" | 18.5 | 36 | None | — |

Illustrative Example 3 and Examples 6-10

An aqueous solution of 1% poly(vinyl alcohol) was placed in a glass jar on a hot plate (RCT Basic from IKA, Wilmington, N.C.) equipped with a temperature controller (ETS-D4 from IKA). In Illustrative Example 3, and in Examples 6, and 8 through 10, the amount of aqueous solution was 90 g. In Example 7, the amount of aqueous solution was 340 g. A jar lid fitted with a septum and openings for a stirring rod shaft and the temperature controller probe was placed on the jar. The solution in the jar was stirred with a VWR Power Max Dual Shaft Mixer (Model 987010) equipped with a three-blade stirring rod (blade diameter of 5 cm) while being purged with nitrogen using a needle through the septum. A mixture of benzoyl peroxide "LUPEROX A98" (1 wt % relative to the weight of the vinyl ester resins) in at least one vinyl ester resin was then added to the poly(vinyl alcohol) solution. The vinyl ester resins used in Illustrative Example 3 and Examples 6-10 and their amounts are shown in Table 2, below. Mechanical stirring was sustained for 10 to 15 min. N,N-dimethylaniline (0.2 wt % relative to the weight of the vinyl ester resins) was then added to the mixture. The temperature of the aqueous mixture was raised to 90° C. as the sample was stirred for an additional 30 min. The resulting beads were collected by filtration and rinsed with water. They were then post-cured in an oven set to 155° C. for 30 min. The amount of styrene shown in Table 2 for Examples 6 to 10 is calculated from the reported amount of styrene for each resin, shown above.

TABLE 2

| Examples | Vinyl Ester Resin 1 | Amount of Resin 1 (g) | Vinyl Ester Resin 2 | Amount of Resin 2 (g) | Styrene content in resin (wt %) |
|---|---|---|---|---|---|
| Illustrative Example 3 | "CoREZYN 8550" | 20 | None | — | 40% |
| Example 6 | Composition A | 8.7 | "CoREZYN 8770" | 11.3 | 23% |
| Example 7 | "DERAKANE 8084" | 79.2 | "CoREZYN 8770" | 79.2 | 34% |
| Example 8 | "DERAKANE 8084" | 6 | "CoREZYN 8770" | 14 | 31% |
| Example 9 | "CoREZYN 8550" | 6 | "CoREZYN 8770" | 14 | 31% |
| Example 10 | "DERAKANE 8084" | 10 | "CoREZYN 8730" | 10 | 37% |

Example 11

Approximately 180 ml of the aqueous solution of 1% poly(vinyl alcohol) was placed in a glass jar. The glass jar was placed on a hot plate equipped with a temperature controller. A jar lid fitted with a septum and openings for a stirring rod shaft and the temperature controller probe was placed on the jar. The solution in the jar was stirred with a mixer equipped with a three-blade stirring rod (blade diameter of 5 cm) while being purged with nitrogen using a needle through the septum. The temperature of the aqueous solution was raised to 95° C. About 0.4 g of benzoyl peroxide "LUPEROX A98" was added to a vinyl ester resin solution comprising 20 g of "CoREZYN 8550" and 20 g of "CoREZYN 8770". The solution was then added to the poly(vinyl alcohol) aqueous solution. The styrene content was calculated to be about 34%. The composition was stirred for 450 minutes. Small amounts of water were added periodically during the polymerization to replace water lost to evaporation. The resulting beads were collected by filtration and rinsed with water. They were then post-cured in an oven set at 155° C. for 30 min.

Samples of the beads prepared as described in Illustrative Examples 1-3 and Examples 1-11 were evaluated under static compression at varying temperatures according to the method described above. Temperatures at which the sample height decreased to 75% of its original value and 50% of its original value are shown in Table 3, below.

TABLE 3

| Examples | Initial Height (mm) | Temperature for 75% Height (° C.) | Temperature for 50% Height (° C.) |
|---|---|---|---|
| Ill. Ex. 1 | 1.05 | 52 | 74 |
| Ill. Ex. 2 | 0.97 | 99 | 147 |
| Ill. Ex. 3 | 0.94 | 69 | 83 |
| Ex. 1 | 0.99 | 101 | 172 |
| Ex. 2 | 0.98 | 116 | 200 |
| Ex. 3 | 1.01 | 111 | 162 |
| Ex. 4 | 1.03 | 110 | 222 |
| Ex. 5 | 1.03 | 109 | 204 |
| Ex. 6 | 1.04 | 124 | >246 |
| Ex. 7 | 1.04 | 112 | >246 |
| Ex. 8 | 0.96 | 122 | >246 |
| Ex. 9 | 0.99 | 120 | >246 |
| Ex. 10 | 0.97 | 102 | 234 |
| Ex. 11 | 0.9 | 117 | 235 |

Samples beads prepared as described in Illustrative Examples 1-3 and Examples 1-11 were swelled in toluene according to the method described above. Percent volume increase for each example is shown in Table 4, below.

TABLE 4

| Examples | Volume Increase (%) |
|---|---|
| Illustrative Example 1 | 88.3 |
| Illustrative Example 2 | 35.3 |
| Illustrative Example 3 | 51.9 |
| Example 1 | 37.8 |
| Example 2 | 32.6 |
| Example 3 | 25.8 |
| Example 4 | 12.8 |
| Example 5 | 24.8 |
| Example 6 | 25.6 |
| Example 7 | 29 |
| Example 8 | 9.6 |
| Example 9 | 13.3 |
| Example 10 | 31.5 |
| Example 11 | 34.1 |

Comparative Example 1

Commercially available proppants (trade designation "FRACBLACK" available from Sun Drilling Products Corp., Belle Chasse, La.) obtained in June 2008 are hereinafter referred to as "Comparative Example 1".

Comparative Example 2

Styrene-divinyl benzene beads with 5% divinyl benzene (from Anhui Sanxing, Anhui, China) were obtained and are hereinafter referred to as "Comparative Example 2".

Illustrative Example 4

The vinyl ester resin "DERAKANE 8084" was mixed with 1.5 wt % of benzoyl peroxide "LUPEROX A98" and stirred at room temperature until the benzoyl peroxide dissolved. A 10 gram portion of the vinyl ester resin/benzoyl peroxide solution was then mixed with 0.015 mL of N,N-dimethylaniline (Sigma-Aldrich, St. Louis, Mo.) for 25 seconds using a speedmixer (obtained from Flacktek, Inc., Landrun, S.C., under the trade designation "DAC 150 FV") at 3000 rpm. This solution was then added to 100 mL of an aqueous solution of 1% poly(vinyl alcohol) in a glass jar. The jar was capped and purged with nitrogen. Sustained magnetic stirring was used to produce a suspension of resin droplets in the aqueous phase. The jar was placed on a hotplate at room temperature that was then ramped up to 100° C. After one hour, the temperature of the suspension was measured to be about 45° C., and the sample was removed. The resulting beads were collected by filtration and rinsed with water. They were then post cured in a 130° C. oven for 30 minutes.

Illustrative Examples 5 and 6

N,N-dimethylaniline (in an amount of 0.04 mL) was added to a 20 g portion of a solution of 1% benzoyl peroxide "LUPEROX A98" in vinyl ester resin "DERAKANE 8084". The resulting solution was mixed using the speedmixer "DAC 150 FV" at 3000 rpm. This resin mixture was added to 100 mL of an aqueous solution of 1% poly(vinyl alcohol) in a glass jar. The jar was capped and purged with nitrogen. Sustained magnetic stirring was used to produce a suspension of resin droplets in the aqueous phase. The jar was placed on a hotplate that was ramped up to 150° C. After 30 minutes, the sample was removed. The resulting beads were collected by filtration and rinsed with water. For Illustrative Example 5, the beads were then post cured in an oven for 30 minutes at 155° C. For Illustrative Example 6, the beads were then post cured in an oven for 30 minutes at 155° C. and then 30 minutes at 200° C.

Samples of Comparative Examples 1 and 2 and the beads prepared as described in Illustrative Examples 4 to 6 were evaluated under static compression at varying temperatures according to the method described above. Temperatures at which the sample height decreased to 75% of its original value and 50% of its original value are shown in Table 5, below.

TABLE 5

| Example | Initial Height (mm) | Temperature for 75% Height (° C.) | Temperature for 50% Height (° C.) |
| --- | --- | --- | --- |
| Comparative Example 1 | 0.99 | 128 | 168 |
| Comparative Example 2 | 1.00 | 96 | 107 |
| Illustrative Example 4 | 0.98 | 85 | 131 |
| Illustrative Example 5 | 1.01 | 95 | 133 |
| Illustrative Example 6 | 0.97 | 98 | 141 |

Samples of Comparative Examples 1 and 2 and the beads prepared as described in Illustrative Examples 4 and 6 were swelled in toluene according to the method described above. Percent volume increase for each example is shown in Table 6, below.

TABLE 6

| Example | Volume Increase (%) |
| --- | --- |
| Comparative Example 1 | 71 |
| Comparative Example 2 | 80 |
| Illustrative Example 4 | 33 |
| Illustrative Example 6 | 60 |

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein.

What is claimed is:

1. A plurality of polymer particles comprising an elastomer-modified crosslinked aromatic epoxy vinyl ester polymer, wherein the elastomer-modified crosslinked aromatic epoxy vinyl ester polymer is essentially free of inorganic filler and wherein a particle from the plurality of polymer particles maintains at least 50 percent of its height under a pressure of $1.7 \times 10^7$ Pascals at a temperature of at least 175° C.

2. A plurality of polymer particles according to claim 1, wherein the particle swells not more than 40 percent by volume when submerged in toluene for 24 hours at 70° C.

3. A plurality of polymer particles according to claim 1, wherein the particle from the plurality of polymer particles maintains at least 75 percent of its height under a pressure of $1.7 \times 10^7$ Pascals at a temperature of at least 100° C.

4. A plurality of polymer particles according to claim 1, wherein the elastomer-modified crosslinked aromatic epoxy vinyl ester polymer is an elastomer-modified novolac epoxy vinyl ester polymer.

5. A plurality of polymer particles according to claim 1, wherein the elastomer-modified crosslinked aromatic epoxy vinyl ester polymer is an elastomer-modified bisphenol diglycidyl acrylic or methacrylic polymer.

6. A plurality of polymer particles according to claim 1, wherein the elastomer-modified crosslinked aromatic epoxy vinyl ester polymer is a copolymer of an elastomer-modified aromatic epoxy vinyl ester resin, optionally a second aromatic epoxy vinyl ester resin that is not elastomer-modified, and at least one of a vinyl aromatic compound or a monofunctional acrylate or methacrylate.

7. A plurality of polymer particles according to claim 6, wherein the elastomer-modified crosslinked aromatic epoxy vinyl ester polymer is a copolymer of an elastomer-modified aromatic epoxy vinyl ester resin, optionally a second aromatic epoxy vinyl ester resin that is not elastomer-modified, and styrene, wherein the styrene is present in an amount less than 40 percent by weight, based on the total weight of the copolymer.

8. A plurality of mixed particles comprising the plurality of polymer particles according to claim 1 and other particles comprising at least one of sand, resin-coated sand, graded nut shells, resin-coated nut shells, sintered bauxite, particulate ceramic materials, glass beads, and particulate thermoplastic materials.

9. A fluid comprising a plurality of polymer particles according to claim 1 dispersed therein, wherein the fluid comprises at least one of water, a brine, an alcohol, carbon dioxide, nitrogen gas, or a hydrocarbon.

10. A method of fracturing a subterranean geological formation penetrated by a wellbore, the method comprising:

injecting into the wellbore penetrating the subterranean geological formation a fracturing fluid at a rate and pressure sufficient to form a fracture therein; and introducing into the fracture a plurality of polymer particles according to claim 1.

11. A method of making a plurality of polymer particles according to claim 1, the method comprising:
provobtaining a mixture comprising an elastomer-modified aromatic epoxy vinyl ester resin having at least two vinyl ester functional groups, a catalyst, and optionally an accelerator for the catalyst;
suspending the mixture in a solution comprising water to form a suspension; and
initiating crosslinking of the elastomer-modified aromatic epoxy vinyl ester resin to make the plurality of polymer particles.

12. A method according to claim 11, further comprising:
separating the plurality of polymer particles from the solution comprising water; and
subjecting the plurality of polymer particles to post-polymerization heating at a temperature of at least 130° C.

13. A method according to claim 11, wherein the mixture further comprises a second aromatic epoxy vinyl ester resin that is not elastomer-modified and at least one of a vinyl aromatic compound or a monofunctional acrylate or methacrylate.

14. A method according to claim 13, wherein the mixture comprises the vinyl aromatic compound, wherein the vinyl aromatic compound is styrene, and wherein the styrene is present in an amount less than 40 percent by weight, based on the total weight of the styrene, the elastomer-modified aromatic epoxy vinyl ester resin, and the second aromatic epoxy vinyl ester resin that is not elastomer-modified.

15. A method according to claim 11, wherein the elastomer-modified aromatic epoxy vinyl ester resin is an elastomer-modified novolac epoxy vinyl ester resin.

16. A method according to claim 11, wherein the elastomer-modified aromatic epoxy vinyl ester resin is an elastomer-modified bisphenol diglycidyl acrylate or methacrylate resin.

17. A plurality of polymer particles according to claim 1, wherein the particle maintains at least 50 percent of its height under a pressure of $1.7 \times 10^7$ Pascals at a temperature of at least 200° C.

* * * * *